United States Patent [19]

McClain

[11] 4,374,786
[45] Feb. 22, 1983

[54] UNITIZED SCRUBBER TOWER

[75] Inventor: Robert W. McClain, Dallas, Tex.

[73] Assignee: Glitsch, Inc., Dallas, Tex.

[21] Appl. No.: 290,148

[22] Filed: Aug. 5, 1981

[51] Int. Cl.³ .................... B01D 47/12; E04B 1/343; B66C 1/32; B66C 1/34
[52] U.S. Cl. ............................... 261/113; 261/114 R; 261/126; 261/DIG. 9; 55/233; 55/358; 55/385 F; 52/745; 294/67 B; 422/49
[58] Field of Search ................ 55/220, 233, 350, 356, 55/358, 385 F; 261/113, 114 R, 126, DIG. 9, DIG. 11; 422/49; 52/79.1, 646, 648, 745

[56] References Cited

U.S. PATENT DOCUMENTS

| | | | |
|---|---|---|---|
| 3,057,137 | 10/1962 | Perlis | 55/303 |
| 3,363,885 | 1/1968 | Meek | 261/DIG. 11 |
| 3,388,534 | 6/1968 | Jensen | 55/269 |
| 3,410,056 | 11/1968 | Reinauer | 55/96 |
| 3,630,005 | 12/1971 | Reinauer | 55/302 |
| 3,680,285 | 8/1972 | Wellan | 55/302 |
| 3,699,747 | 10/1972 | Kroll | 55/96 |
| 3,785,780 | 1/1974 | Teichmann et al. | 261/DIG. 9 |
| 3,823,531 | 7/1974 | Crawley | 55/385 F |
| 3,837,151 | 9/1974 | Jensen | 55/341 |
| 3,870,773 | 3/1975 | Luzaich | 261/DIG. 11 |
| 3,898,062 | 8/1975 | Slakey | 55/269 |
| 4,133,472 | 1/1979 | Maxwell | 52/745 |

FOREIGN PATENT DOCUMENTS

| | | | |
|---|---|---|---|
| 1259041 | 3/1961 | France | 52/745 |
| 571510 | 11/1944 | United Kingdom | 261/DIG. 11 |

OTHER PUBLICATIONS

Bulletin: Mikro Products-Bulletin 571-C; pp. 3, 5 put out by Pulverizing Machinery, Division of Slick Corp. Data Sheet: Carter-Day Company, Dynamic Modular Dust Filter; Data Sheet No. DF-1; pp. 1 and 2.

Primary Examiner—David L. Lacey
Attorney, Agent, or Firm—Joseph H. Schley; Thomas L. Cantrell; Stanley R. Moore

[57] ABSTRACT

The device of the present invention utilizes a unitized scheme to erect a sulphur dioxide scrubber tower wherein a set of factory built constituent subunits are joined at location to produce a single functional unit. The functional units themselves preferably are adaptable for parallel grouping as necessary to insure the treatment capacity required for the emission rate of any given application or where otherwise appropriate for other process reasons.

The temporary strength and rigidity necessary to maintain a subunit's critical geometric integrity throughout construction, transportation and erection processes is provided by a reusable exoskeletal support cradle. Preferably each subunit is initially constructed upon such a cradle. Alternatively, subunits are constructed in jigs at the factory and transferred to the support cradles before shipping to the construction site. Each subunit is transported to location, rotated for erection, lifted into place and attached into assembly while still affixed to its cradle. Thereafter the cradle, having served its purpose, is removed and returned to the factory for reuse. The assembled functional unit has a minimal amount of internal members and relies upon cooperation between subunits to support the tower.

9 Claims, 18 Drawing Figures

UNITIZED SCRUBBER TOWER

BACKGROUND

Sulphur dioxide is a harmful pollutant that must be removed from stack emission before it can be safely discharged into the environment.

Commercially feasible techniques have been developed whereby sulphur dioxide is separated through processes that draw the sulphur dioxide into a liquid which is retained when the cleansed gas is expelled. In such processes sulphur dioxide is either absorbed (as sulphur dioxide) into water or some other liquid or, alternatively, otherwise reacted with chemicals in a liquid solution. Scrubber towers house structures that promote this type of cleansing process by maximizing the emission-gas to liquid interface across which the sulphur dioxide is drawn into the liquid.

Inside the scrubber towers are multiple levels of substantially horizontal shallow trays across which the absorptive or reactant liquid flows. The stack emission-gas bubbles through the depth of liquid on each tray as a pressure differential drives the gas through small apertures and flows across it to the downcomer by which means it transfers to the next lower tray. The liquid flows across this second tray to another downcomer, repeating the process across a series of descending trays while a flow of emission-gas, entering at the base of the tower, ascends through the same series of trays.

Ordinary applications require towers of considerble size, generally much too large to allow a tower to be factory constructed and then transported to location. Rather, typical current construction techniques use concrete tower walls slip-formed at location as the primary supporting structure. A round steel tower of conventional field erected construction is sometimes substituted for the concrete tower. In either case, a perimeter support structure is constructed at location and field construction continues as bracing, supports, trays and other internal structures are assembled and installed into the perimeter support structure. However, on site construction is subject to several disadvantages when compared to factory construction. Economic factors favor factory construction because labor and other costs of field construction tend to run higher and because field construction incurs additional expenses in bringing complete construction teams and equipment to the site. In addition, the conditions of field construction are less controlled and prove more difficult to supervise. These latter alternatives of field construction not only make field construction more expensive, but makes quality control more difficult and subjects the entire duration of the construction process to a dependence upon favorable weather. Nevertheless, on site construction remains the industry practice, even though more of the construction might be done at the factory.

One principal constraint currently limiting factory construction is the common practice described above of using poured-in-place concrete tower construction. Though factory construction is dependent upon a major change in the basic design, exterior support remains a primary consideration as all internal structures need corrosion resistant properties at a cost which restrains the use of major internal supporting structures. Furthermore, internal support members waste tower space, since they do not function directly in the scrubbing process.

Another constraint limiting factory construction is the size of the tower which prohibits the final assembly in the factory as well as the economical transport of the assembled tower to location.

Prior workers building other chemical process equipment such as baghouses, have attempted to deal with some similar problems by so reducing the size of the equipment that, at best, completely assembled functional units can be made at the factory, be ganged into batteries at location, and perhaps be installed with common duct work. See U.S. Pat. No. 3,680,285.

That approach is "unitized" in a sense in that it joins modules together, but each module is an independent functional unit, that is to say that no joining of constiutent subunits is necessary to produce a functional unit. This approach, as applied to scrubber towers, is lacking because construction on a reduced scale producing functional scrubber tower units of transportable size greatly decreases the proportion of the functioning members, here trays, to other structures.

SUMMARY OF THE INVENTION

The device of the present invention utilizes a unitized scheme wherein a set of constituent subunits is necessary to produce a single functioning unit which is preferably adapted for parallel grouping in order to insure the treatment capacity required for the emission rate of a given application or where otherwise appropriate for other process reasons.

Throughout the remainder of this application the word "subunit" shall be used to designate the use of constituent subunits, where no subunit is, of itself, a functional unit. In such a functional unit, each subunit need not have a full compliment of elements because each relies upon the cooperation of the associated subunits in order to create an operational scrubber tower.

It is preferred that the internal elements be made of stainless steel because operation places them in continuous contact with severe corrosives. Other protective means such as plate, lamination, or special coating can serve this purpose, but are less effective at preventing corrosion and, even so, remain fairly expensive. Accordingly, internal support members have been minimized in favor of the use of less expensive materials appropriate for support externally. Currently popular concrete construction is not readily adaptable to unitized construction. Neither are round steel towers conducive to unitized construction as this shape lends itself to constituent subunitization only at a relatively high cost of materials in relation to the tower space so produced. Rather the unitized modular construction contemplated by this device is best realized by forming a rectangular structural perimeter which utilizes an external rib framework to reinforce a plate wall. In the preferred embodiment the ribs are of carbon steel to impart structural strength to the stainless steel plate.

It should be noted that subunits are not necessarily interchangeable. The illustrated preferred embodiment is so proportioned that six constituent subunits are required for each functional unit. Four of the subunits are corner subunits, each with two perimeter wall sections; and two subunits are set between corner subunits and are refered to herein as interior perimeter subunits, each with only one perimeter wall section.

Where functional units are designed with three or more subunits in both length and breadth, a third type of subunit is also present, wholly interior subunits, each of which has no associated perimeter wall section.

Perimeter walls are of two types, external perimeter walls and, when subunits are adapted for the grouping of functional units, common (perimeter) walls are also present. An external perimeter wall has one wetted surface and one wholly exterior surface and it is the latter surface, which is not subject to the corrosive interior environment, that is reinforced with carbon steel. Common walls are interior partitions of grouped functional units and are shared between the adjoining functional units of that larger grouping. In this manner, each face of a common wall is exterior to one functional unit and, at the same time, interior to the adjoining functional unit.

In contrast to the external perimeter, both sides of the common wall are exposed to the corrosive internal environment and, as it is preferred that internal supporting structures be resistant to corrosion, economic considerations suggest the minimization of the internal supports associated with the common wall sections. Cooperation between contiguous exterior perimeter walls, in conjunction with the minimal interior framework, make up for the lack of rib framework on common walls.

Each subunit has a minimal internal framework attached to the associated perimeter wall section, if any, some members of which provide a horizontal rectangular tray support frame at each desired tray elevation. Four horizontal tray supports make up each tray support frame. Each support frame has one tray support affixed to the interior face of each perimeter wall section, thus interior perimeter subunits have one, corner subunits have two and wholly interior subunits have no tray supports so affixed. Remaining tray supports are arranged to complete the horizontal rectangular frame. A vertical support is attached to each corner of the tray support frame that is set apart from the perimeter walls. Thus a corner subunit with two perimeter wall sections has but one corner of the support frame extended from the perimeter outer wall and requires only one vertical support, while an interior perimeter module with one perimeter wall section requires two vertical supports and a wholly interior module requires four vertical supports. Additional support is provided at a minimal addition to interior material by providing diagonal bracing from the vertical support to tray supports and the perimeter wall sections.

A series of horizontal tray support frames are disposed vertically between the vertical supports and perimeter wall sections. Tray sections of various configurations, including collector and absorption trays as well as other structures such as mist eliminators are affixed as needed into the tray support frames.

Further, subunits are coordinated such that trays are continuous across subunit boundaries. In this fashion unitary trays are established across functional units, or alternatively, intermediary downcomers are provided for without regard to subunit boundaries.

Thus, this method of tower construction utilizes constituent subunits that are factory constructed in sizes convenient for transport to location and erection at the site. However another constraint, the additional expense of materials appropriate for internal structure, urges a minimum of internal support structures.

A subunit designed solely for an erected strength of joined modules and joined functional units does not provide strength and rigidity to individual constituent subunits sufficient to maintain critical geometric integrity during stresses of assembly, transportation and erection processes. Dimensions and angular relationships must be maintained true in order to provide sealable contacts between adjoining perimeter wall sections and the tray sections alignment necessary to provide continuous trays across subunit boundaries where desired. This additional support is provided by reusable exoskeletal cradles upon which each separate subunit is attached rather than by permanently committing a substantial quantity of materials to provide for these transitory requirements. The subunit is affixed to a cradle either during construction or in preparation for handling operations by bolts or other temporary and removable means and the attached cradle imparts strength and rigidty to the evolving subunit. Upon completion of factory construction, the subunit is transported in the support of the cradle to which it is affixed. Typically the size of the subunit necessitates transfer by crane onto and off of transportion surfaces such as railroad flatcars or truck beds. These transfer operations require the strength and rigidty of the cradle to which the cable suspension system attaches. Without the cradle, the stress to the subunit imparted by a limited number of cable attachments would distort the critical alignments within the subunit.

Once on the site, the subunit is tilted from the horizontal orientation used for both assembly and transport operations to a vertical orientation for tower erection. During this reorientation, the stresses are carried primarily by the cradle and do not exceed limits within the subunit necessary to take members out of their crucial alignment. As reoriented, the subunit is suspended in an erect position by a cable attached to a lift lug located on the top the cradle structure and above the combined center of gravity for the subunit and its attached cradle.

Suspended erect, the subunit is moved to its place within a functional unit and is there attached, first to the foundation and then to adjoining subunits. Preferably the external perimeter is first bolted together through adjacent vertical beams of the exoskeletal framework and then the interior is welded to seal the inter-subunit perimeter wall seams. In addition, the embodiment discussed above necessarily presents vertical supports of adjoining subunits as adjacent multiple groupings, well suited for interconnection and it is preferred that these vertical supports as well as adjacent tray supports and other horizontal structure be bolted or welded together.

Once several subunits are attached together, the subunits coooperate to adequately support the assemblage without the support of the cradles. The cradles are thereafter removed and returned to the factory where they are available for reuse with other subunits.

In this manner construction continues until functional units and groupings are assembled and the roof structures and fluid circulatory system are installed, completing the scrubber tower. It is the cooperation of subunits fully attached throughout each functional unit and group, not the mere accumulation of subunits, that achieves the strength and rigidity necessary for scrubber tower application.

BRIEF DESCRIPTION OF THE DRAWINGS

FIG. 7 through FIG. 13 form a progression or movie illustrating tower assembly:

DETAILED DESCRIPTION OF THE DRAWINGS

Figure 1:
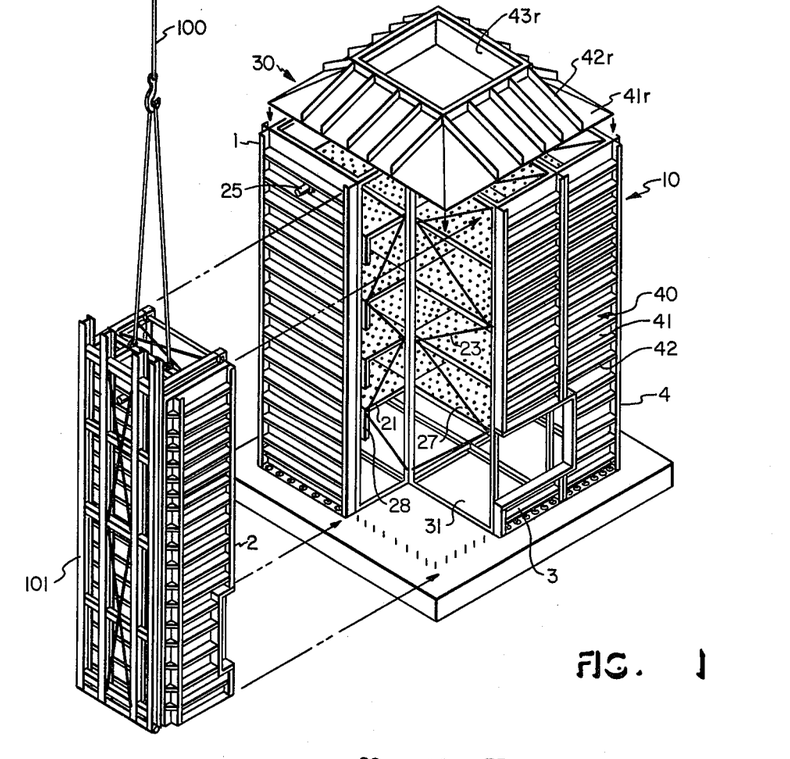
FIG. 1 is a perspective view of a partially assembled scrubber tower unit.

FIG. 1 illustrates a partially assembled functional unit of $SO_2$ scrubber tower 10 being assembled in accordance with the constituent subunit construction of the present invention. In the preferred embodiment, scrubber tower 10 consists of six constituent subunits; subunits 1, 2, 3, 4, 5 and 6, respectively. See FIG. 3. Returning to FIG. 1, subunits 1, 2, 3 and 4 are clearly illustrated, while subunits 5 and 6 are obscured at the back of the tower unit. Subunit 2 is shown apart from the scrubber unit and attached to supporting cradle 101 and thereby suspended from cable 100. This view allows inspection of the interior of tower unit 10. The major structural support for the tower lies in its exterior perimeter wall 40 which is made of plates 41 having reinforced ribs 42.

Figure 2:
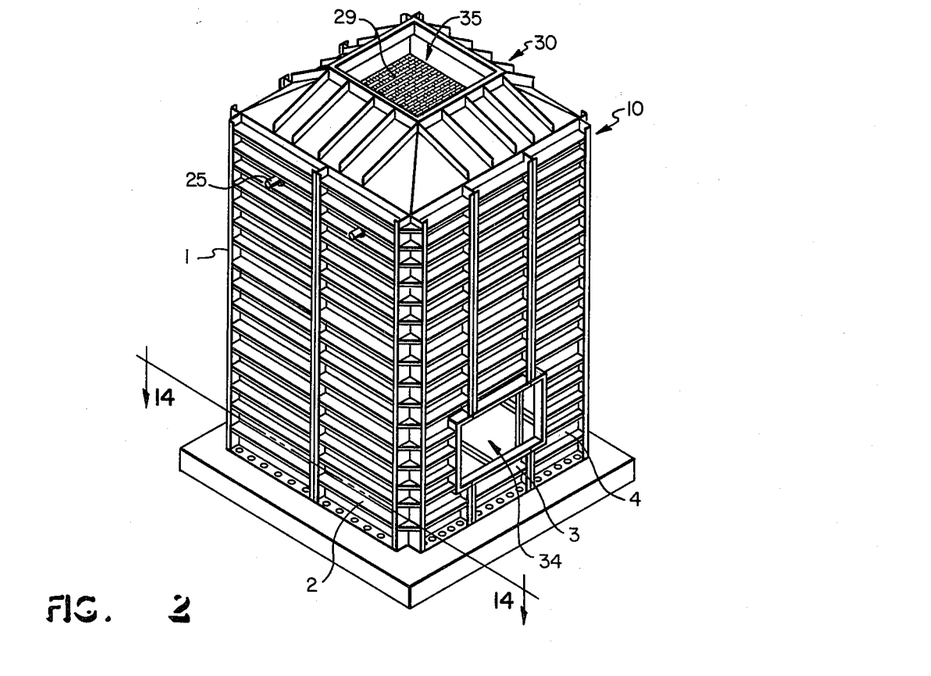
FIG. 2 is a perspective view of an assembled scrubber tower unit.

FIG. 2 illustrates a single completed scrubber tower unit, 10. The emission-gas to be scrubbed enters the tower at intake 34, flows through the tower where it is cleansed, and is expelled into the environment through roof 30 by passing through chimney 35 and through conventional ductwork to the exhaust stack. The ductwork and the stack have been omitted from these drawings. The scrubbing liquid enters the top of the scrubber tower through nozzles 25.

Figure 5:
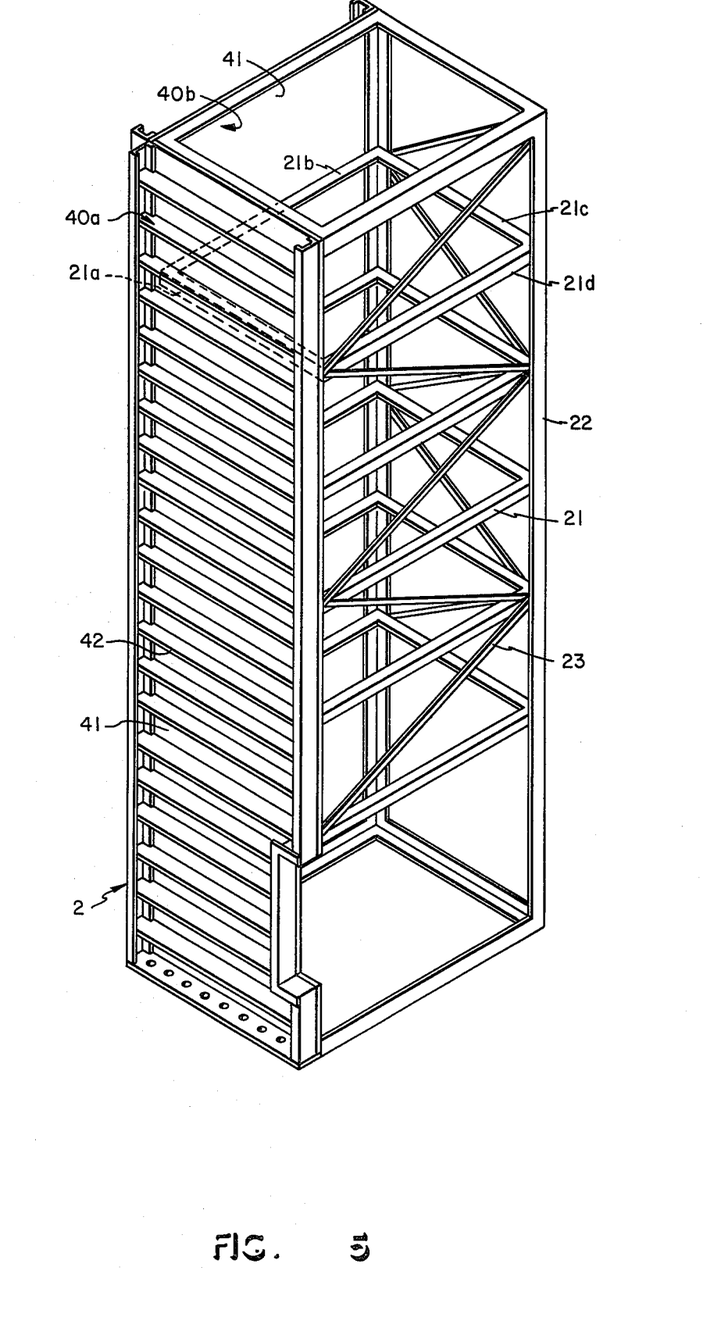
FIG. 5 is a perspective view of a portion of a corner subunit.

The emission-gas is cleansed of sulpher dioxide by drawing the sulpher dioxide into the scrubbing liquid which is retained when the cleansed gas is expelled into the environment through chimney 35. The paramount function of the scrubber tower is to promote this action by maximizing the emission gas-to-liquid interface across which the sulphur dioxide is drawn. This is accomplished by the use of a counterflow through multiple levels of shallow trays 27 across which the scrubbing liquid flows. See FIG. 1. The emission gas successively bubbles through the depth of liquid on each of these trays. The liquid, in the preferred embodiment, enters at the top of the scrubber tower through nozzles 25 and is dispersed in a spray above the uppermost tray. This tray fills and the liquid is transferred by a downcomer 28 to the next lower tray. The liquid flows across this tray to another downcomer, and so on, repeating the process across a series of descending trays while a flow of emission-gas, entering at the base of the tower at intake 34, ascends through the same series of trays. Downcomers 28 are attached to trays 27, which rest on tray supports 21. FIG. 5 shows the internal tower unit structure in greater detail.

FIG. 5 illustrates a portion of subunit 2 with the trays 27 and downcomers 28 removed. Subunit 2 is a corner subunit in which the two perimeter wall sections have been designated 40a and 40b. The external perimeter walls are formed from plate 41 reinforced by exterior ribs 42. Shifting support requirements to external ribs 42 allows the use of cheaper yet structurally sufficient materials such as carbon steel to support the tower. This, in turn, allows use of a thinner gauge plate as plate 41 where expensive corrosion resistant properties are required. Internal support is provided by horizontal structural members or tray supports 21, vertical supports 22 and diagonal braces 23. Substantially horizontal rectangular tray support frames are formed of sets of horizontal structural members 21 which are utilized as tray supports that establish a perimeter upon which tray sections 27, omitted in this illustration, are set. It is not necessary that every horizontal structural member actually be utilized to support a tray, however in this subunit one set of horizontal structural members 21 that is used to support a tray section 27 comprises tray support 21a on the interior of perimeter wall 40a, a similar tray support 21b attached to the hidden side of wall 40b where it is illustrated by dotted outline, a tray support 21c running from wall 40b to vertical support 22, and a tray support 21d running from vertical support 22 to wall 40a. The tray supports as well as the general configuration of the subunit is secured by diagonal bracing 23 between vertical support 22 and horizontal tray supports 21. Tray sections 27 fit into place upon these frames as shown in FIG. 1. Typically the tray sections are secured by clips to the tray support frames during factory construction.

Figure 3:
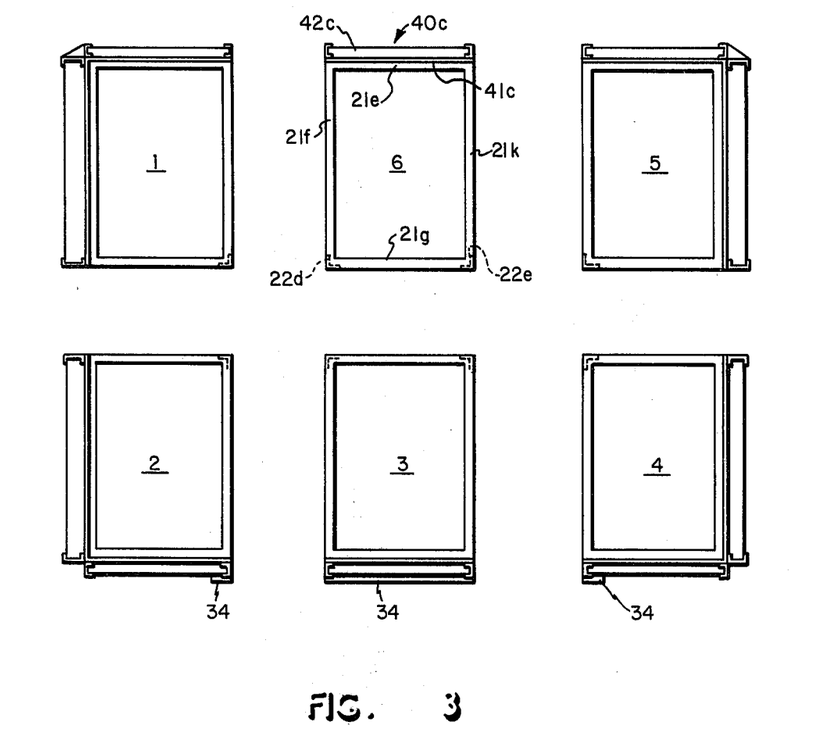
FIG. 3 is an exploded horizontal cross section of a scrubber tower unit illustrating the interrelation of the constituent subunits.

Reference to FIGS. 1, 3 and 5 aid in understanding the cooperation of individual constituent subunits in forming a functional $SO_2$ scrubber tower unit.

Reference to FIG. 3 is useful in comparing the appearance of the elements discussed above in each of the various subunit configurations. This figure is a horizontal cross section of one functional scrubber tower unit 10. Disregarding for the moment provision for intake 34, subunits 2 and 5 are identical corner subunits as are subunits 1 and 4. Further, in the preferred embodiment subunits 1 and 4 are related to corner subunits 2 and 5, but these pairs are not identical, rather each pair is the mirror image of the other. Alternatively, subunits having a square horizontal cross-section produces greater interchangability. Thus the above discussion concerning subunit 2 as viewed in FIG. 5 is representative of each corner subunit. Compare these with interior perimeter subunits, subunits 3 and 6.

Again disregarding the intake 34, subunits 3 and 6 are identical and subunit 6 will be discussed as representative of an interior perimeter subunit. Subunit 6 has one perimeter wall, 40c which is comprised of plate 41c and ribs 42c. The inside of perimeter wall 40c has a series of horizontal structural members or tray supports 21e. At least at every level where a tray support 21e is desired to support a tray section 27, horizontal tray supports 21f and 21k project interiorly from opposite ends of that wall mounted tray support 21e. Tray supports 21f and 21k are spaced apart by the width of their constituent subunit to terminate at vertical supports 22, here 22d and 22e, to which they respectively connect. Tray supports 21g run between vertical supports 22d and 22e at each tray level and, together with tray supports 21e, 21f, and 21k, form horizontal rectangular frames onto which the trays are set. FIG. 1 illustrates diagonal bracing 23 and tray section 27 in interior perimeter subunit 3.

The arrangement discussed above is slightly complicated by the presence of intake 34. The expected flow rate of stack emission gas into the tower unit requires that intake 34 in the preferred embodiment exceed the width of a subunit and further, if centered, that the intake must be formed across adjoining subunits 2, 3, and 4. See FIG. 2. This irregularity inhibits the ultimate inter-changeability of the constituent subunits alluded to above.

Figure 3A:
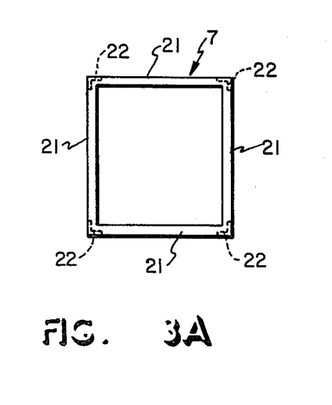
FIG. 3A is a horizontal cross section of a wholly interior subunit.

Further, should it be desired that a single functional unit attain a size that requires three or more constituent subunits in both length and breadth, the addition of wholly interior constituent subunits becomes useful. FIG. 3A shows the configuration of a wholly interior subunit 7. Such a wholly interior subunit, unlike corner and interior perimeter subunits, has no perimeter wall. Rather, each horizontal structural member or tray support 21 within the subunit extends between vertical supports 22. Here there are four such vertical supports and the subunit relies upon these, horizontal structural members or tray supports at each tray level, and diagonal bracing 23 (not seen in this view) for structural support.

Figure 4:
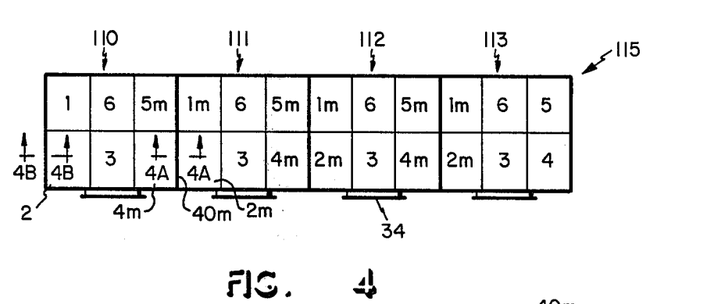
FIG. 4 is a horizontal cross section illustrating the arrangement of constituent subunits and functional tower units with a group.

FIG. 4 illustrates the grouping together of four functional scrubber tower units, tower units 110, 111, 112 and 113 into group 115. Such an arrangement increases treatment capacity by providing for parallel processing of stack emission gas where an application involves a plurality of stacks, each conveying stack emission gas requiring treatment, or where the output of a single stack is so great that it must be divided into several smaller streams for treatment. Alternatively, interconnection of intakes 34 and chimneys 35 allows series groupings. In the parallel grouping illustrated, each scrubber tower unit within the group is formed by joining six constituent subunits, subunits 1, 2, 3, 4, 5 and 6 as discussed above. However, some of the subunits in each of the units have been modified for grouping. These modified constituent subunits are numbered consistantly with the prior discussion, but with the addition of an "m" suffix. These subunits must be modified from the single functional unit description of the foregoing discussion in order to allow adjoining units to share common perimeter walls. Thus scrubber tower unit 110 has subunits 4m and 5m which share common perimeter walls with subunits 2m and 1m of tower unit 111, respectively. Similarly, tower units 111 and 112 each have subunits 4m and 5m which share common perimeter walls with subunits 2m and 1m of each of tower units 112 and 113, respectively. One of these common walls has been designated 40m and is discussed as representative of each common wall.

Common wall 40m is shared between adjoining subunits 4m and 2m of adjoining tower units 110 and 111. Each common wall arrives at the erection sight as a part of only one of the subunits and thereon forms one of two perimeter walls within a corner subunit. However, the common wall is unlike the perimeter walls of the corner subunits discussed before and the exterior of this wall of the corner subunit is not ribbed with typical structural elements, rather it is exteriorly reinforced only with mounted tray supports 21m. See FIG. 4A. There the common wall 40m is formed on subunit 4m and presents tray supports 21m to subunit 2m. Subunit 2m of unit 111 is thus modified by deleting the perimeter wall on the side adjoining unit 110 leaving subunit 2m with a configuration more like an interior subunit than a corner subunit. Upon connection, wall 40m serves support and containment functions for both subunits 4m and 2m. Each common wall shares this relationship between the subunits it serves and in this manner the suggested grouping represents a substantial savings of material over the use of multiple separate units. Further, the adjoining units structurally cooperate to sustain the combined load in the absence of the plates and ribs that are deleted.

Figure 4A:
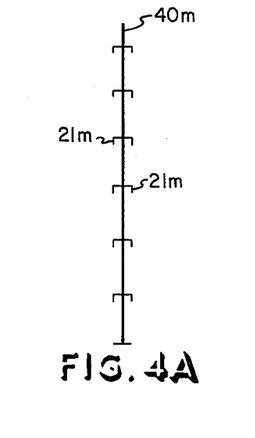
FIG. 4A is a vertical cross-section of a common wall.
Figure 4B:
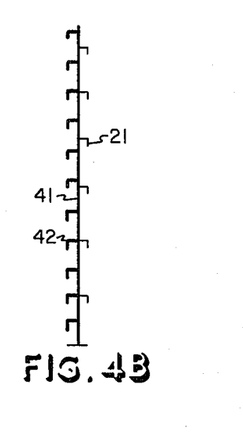
FIG. 4B is a vertical cross-section of a perimeter wall.

Compare FIG. 4B which is a cross-section of an exterior perimeter wall with FIG. 4A which, as discussed above, is the cross-section of a common or interior perimeter wall. The exterior perimeter walls are the major structural component and plate 41 is heavily reinforced with ribs 42 to provide the required support.

The present invention seeks to maximize factory construction over field construction and to minimize interior structure where special corrosion resistant properties are required. However, subunit construction at the factory necessitates several operations which stress the assembled subunit in excess of those loads reasonably anticipated for normal working operations. Particularly critical operations are involved in loading, unloading and erection procedures. Each of these operations stress the assembled subunits to a degree that threaten alignment within each subunit that are required in order to assemble the individual subunits into scrubber tower units. Rather than permanently committing materials to meet these transitory requirements, the present invention uses a detachable exoskeletal support cradle denoted generally as 101 in FIG. 1. FIG. 6 through FIG. 12 illustrate support cradle 101 in greater detail.

Figure 6:
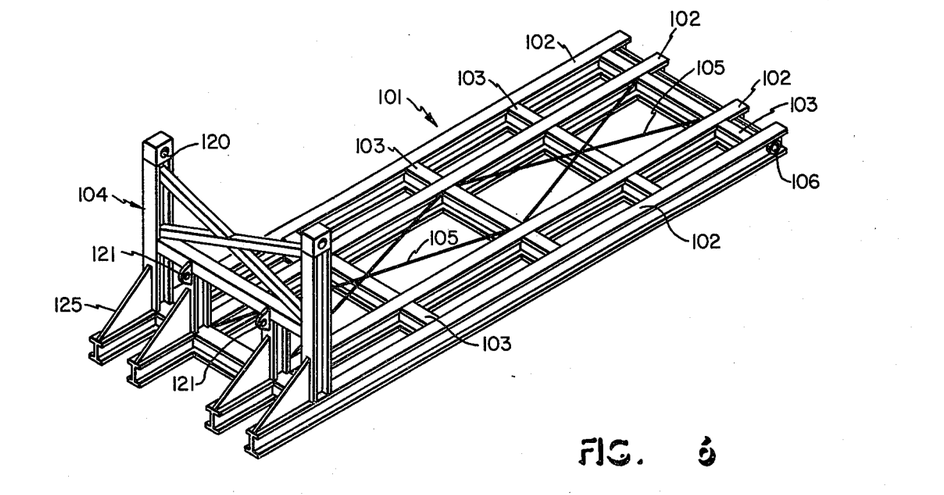
FIG. 6 is a perspective view of a cradle support.

FIG. 6 illustrates a perspective view of an empty support cradle 101. The attachment face of support cradle 101 is made of longitudinal beams 102 and transverse beams 103. The longitudinal and transverse beams are drilled to receive bolts that pass through these to engage the structural framework of a constituent subunit. Further, the rigidity of the cradle is increased by placing the longitudinal cradle framework under both longitudinal and transverse compression by applying tension through tie rods 105. At one end of longitudinal beams 102 is a transverse pipe 106 which serves a dual purpose as a point for cable attachment and as a pivot axis during the subunit rotation from horizontal to vertical orientation to be discussed further below.

At the other end of longitudinal beams 102 is the top support framework 104 which includes padded holes 120 and lift lugs 121 as attachment points for a lifting cable. Also note gusset plates 125 which strengthen the connections of the top support framework to the longitudinal beams 102.

Figure 7:
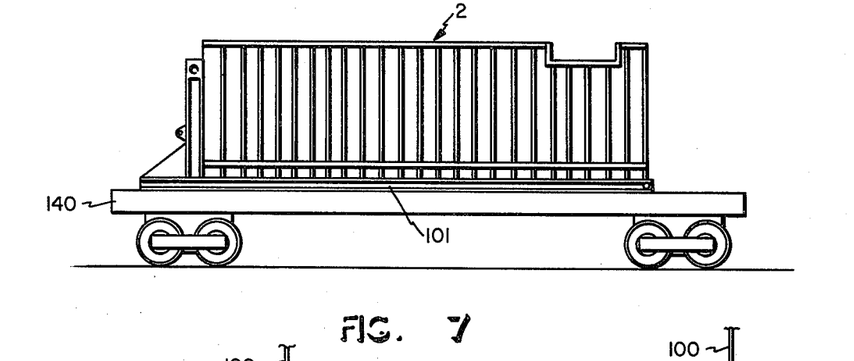
FIG. 7 is a side elevational view of a subunit mounted on a cradle and loaded upon a railroad flatcar.

FIG. 7 through FIG. 13 outline steps of tower erection. FIG. 7 shows an individual subunit mounted on support cradle 101 and loaded on a railroad flatcar 140. The subunit was constructed at the factory to the largest size which remains conducive to economical transportation. Preferbly, the subunit is originally assembled upon support cradle 101. Alternatively, the module is constructed within jigs independent of any cradle and cradle 101 is attached only as a final step in preparation for handling operations.

Figure 8:
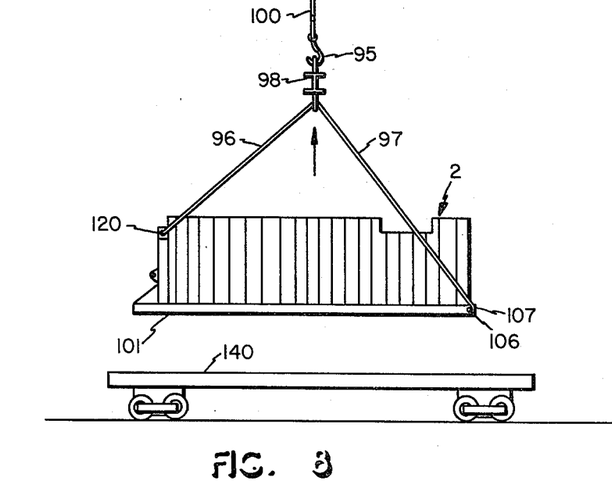
FIG. 8 is a side elevational view of a subunit and cradle support being lifted in an unloading operation.
Figure 9:
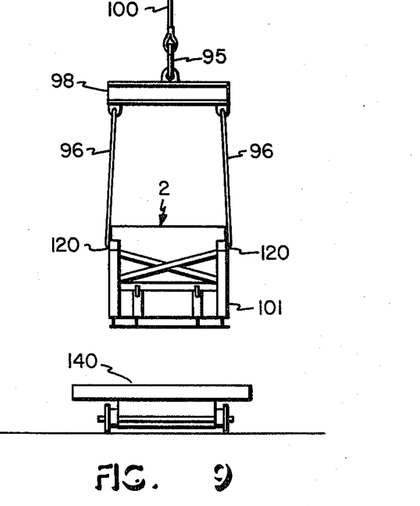
FIG. 9 is a front elevational view of a subunit mounted on a cradle and being unloaded upon a railroad flatcar.

FIGS. 8 and 9 illustrate subunit 2 suspended horizontally in support cradle 101 and ultimately upon cable 100. Cable 100 is the load line of a crane and terminates at the load end with hook 95. Cables 96 and 97 are connected to spreader 98 and thereby to the hook and the load line. Cable 96 engages padded holes 120 while cable 97 engages pick-up pipe 107 which is inserted through pipe 106. Together these members form a particularly appropriate connection means by which a crane, not shown, lifts the cradle and its attached subunit.

Figures 10, 11, 12, 13:
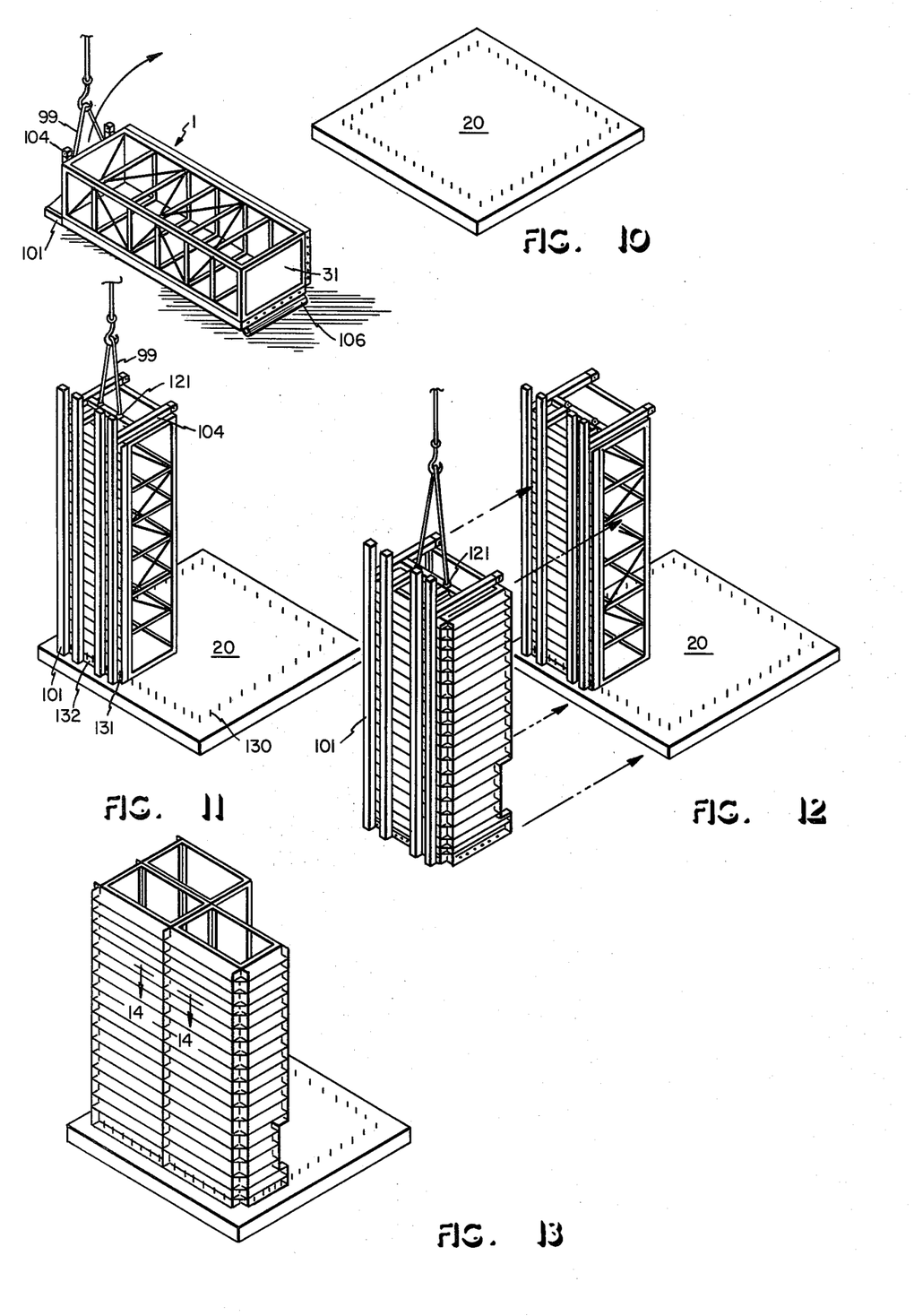
FIG. 10 is a perspective view of a subunit delivered at the construction site and about to be reoriented into a vertical position.
FIG. 11 is a perspective view of a subunit being fastened in place.
FIG. 12 is a perspective view of a second subunit being positioned with a prior subunit upon the foundation.
FIG. 13 is a perspective view of several subunits joined together upon the foundation.

FIG. 10 shows subunit 1 unloaded at the construction site and placed next to the concrete foundation 20 upon which a scrubber tower is to be assembled. In normal construction, subunit 1 rests upon support cradle 101 until several subunits have been affixed in place and interconnected. However, the support cradle can be removed and reused elsewhere should a substantial delay be expected between delivery and tower erection. At time for tower erection a smaller number of support cradles can be rotated among subunits and utilized for erection when needed. Alternatively, modified support cradles might serve this latter purpose wherein cradles are modified by widening each to accommodate a plurality of subunits at one time. This latter instance also allows for interconnecting factory constructed constituent subunits on site before erection, but otherwise changes tower construction little.

Subunit 1 is lifted from a horizontal to a vertical orientation between FIGS. 10 and 11 and the subunit pivots on pipe 106 which is mounted on that end of the cradle most remote from the top support framework 104 where cables 99 engage lift lugs 121. In the vertical orientation of FIG. 11, lift lugs 121 align with the center of gravity for the combined subunit and attached support cradle. Thus, when the cradle and subunit are lifted by these lugs the subunit first pivots to an upright position and then is lifted, maintaining this vertical orientation. The cradle is the primary load carrier with respect to its attached subunit throughout this critical construction step.

FIG. 11 shows subunit 1 being set into place upon foundation 20 and engaging bolts 130 extending from the foundation through holes 131 drilled through base plate 132. See also FIGS. 14 and 15.

In the next figure of the sequence, FIG. 12, subunit 1 is shown mounted to the foundation and secured there with anchor bolt lugs 133. See FIG. 15. Returning to FIG. 12, subunit 1 is still aided by a support cradle 101 as subunit 2 is being brought into the position where it is to be mounted to the foundation and connected to the adjoining subunit. This process continues until enough subunits have been connected in place that the subunits cooperate sufficiently to support themselves in the absence of aid from the supporting cradles 101. After this point, the cradles are removable once each subunit has been mounted on the foundation and connected to its adjoining subunit. See FIG. 13. The support cradles are then returned to the factory for use with other subunits. Thus, subunits can be fabricated in the shop using more efficient and less costly labor, then, supported by the cradle, transported to the desired scrubber tower site where said tower is assembled from said constituent subunits with only a small amount of labor to be performed in the field.

Figure 14:
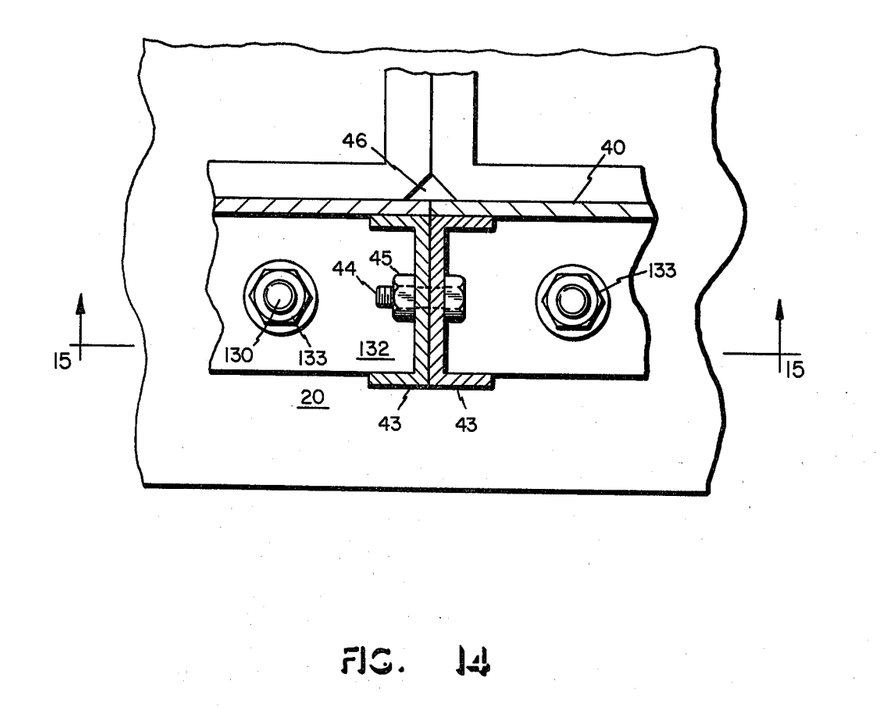
FIG. 14 is a cross section of a connected subunit boundary taken at line 14—14 shown in FIG. 13.
Figure 15:
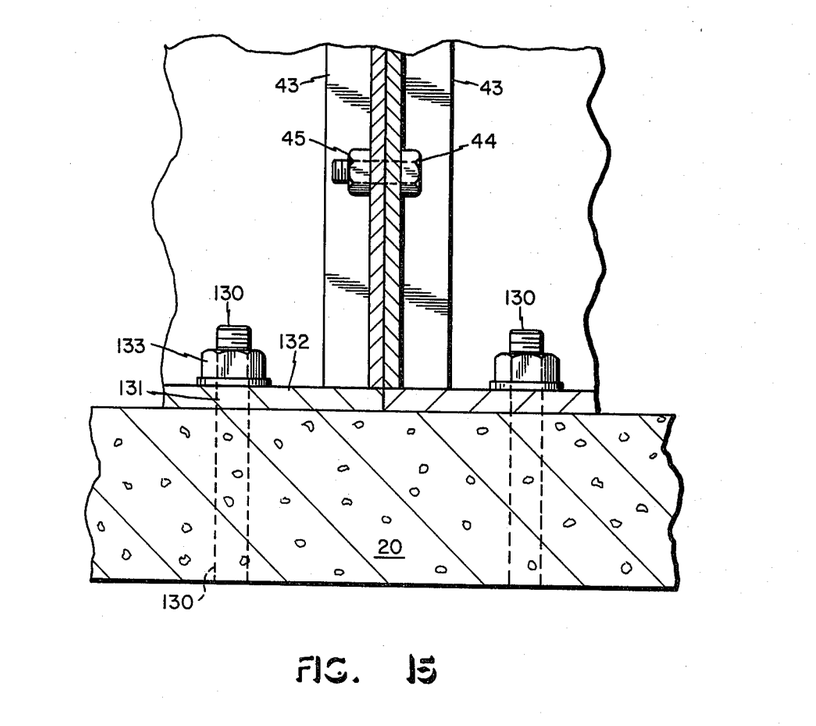
FIG. 15 is a sectional side elevational view taken at line 15—15 of the subunit boundary illustrated in FIG. 14.

FIG. 14 and FIG. 15 illustrate in greater detail the interconnection of subunits by nuts 45 and bolts 44 through vertical beams 43 between which horizontal ribs 42 are attached. Further, note notch 46 in the internal framework illustrated in FIG. 14 which facilitates welding adjoining subunits to seal the tower unit. The perimeter walls 40 must be sealed at the junction of subunits throughout each tower unit, however, properly aligned and adjoining tray sections need not be sealed except as required for process reasons.

The basic tower structure is erected at site from factory assembled constituent subunits in the manner described above. The scrubber tower unit is then crowned with roof 30 which is itself shipped in several large factory assembled sections. The preferred embodiment uses four sections, one for each side of a scrubber tower unit. It is most convenient to join the roof sections about chimney rim 43r on the ground and thereafter lift and attach an assembled roof 30 onto tower unit 10. See FIG. 1. The assembled roof formed from plate 41r as reinforced with ribs 42r and is otherwise similar to perimeter wall 40 in both structure and means of attachment.

Finally, provisions must be made to circulate the scrubbing liquid through the tower unit. The scrubbing liquid is introduced into the cleansing process by passing through the perimeter wall within nozzles 25 located near the top of the tower. Usually a chevron or mist eliminator 29 is mounted on the uppermost tray supports and, in this case, the nozzles 25 bring the liquid into the tower to be dispensed in a spray below the mist elminator and above the uppermost of trays. A continuous flow of the liquid then descends through the series of trays after which it collects on floor 31 of the tower unit. The liquid is drained from the floor of the scrubber tower unit and a portion of the liquid is pumped up to nozzles 25 and recycled. Some of the liquid used in a cycle is subject to removal for processing and is replaced with fresh scrubbing liquid which joins the liquid to be recycled. This circulation system differs little from that of conventional scrubber tower systems. However, it does become convenient in the use of constituent subunit construction to provide these nozzles with an exterior distribution system rather than establishing any interior inter-subunit distribution system. Other types of circulation systems and vapor-liquid contact means are well known in the art that are adaptable for use in a scrubber tower of the present invention.

Connection of a conduit carrying unprocessed stack emission gas to the tower unit at intake 34 and of a conduit carrying cleansed gas from chimney 35 to an exhaust stack completes the construction of a functional scrubber tower unit.

I claim:

1. A rectangular scrubber tower for removing toxic gases and pollutants from relative high volume industrial exhausts; said tower being principally exteriorly supported at its perimeter, having means for mixing a scrubbing liquid with the exhaust; said tower comprising:

a. a plurality of prefabricated constituent subunits, a plurality of which are perimeter subunits, each said perimeter subunit comprising:
  (1) a perimeter wall section comprising:
    i. a corrosion resistant plate;
    ii. a rib framework attached to said plate whereby said plate is exteriorly reinforced; and
    iii. a plurality of horizontal support members attached to the interior of said plate;
  (2) at least one interior vertical support; and
  (3) additional substantially horizontal supports connecting said vertical support to said perimeter wall section;
b. a foundation upon which said tower is supported;
c. means for securing said constituent subunits to said foundation;
d. means to connect said constituent subunits to each other whereby a single functional scrubber tower is assembled from a plurality of said constituent subunits; said connection means comprising;
  (1) means for interconnecting the rib framework of adjacent perimeter constituent subunits; and
  (2) means for sealing the connection of adjacent perimeter wall sections;
e. an inlet through at least one of said perimeter wall sections whereby the exhaust bearing toxic gases and pollutants enters said scrubber tower;
f. a roof connected to an upper edge of said perimeter wall section of at least one of said perimeter subunits having a chimney whereby cleansed exhaust is released from the scrubber tower; and
g. a floor connected to each said perimeter wall section of at least one of said perimeter subunits between said foundation and the lowermost of said trays.

2. A rectangular scrubber tower for removing toxic gases and pollutants from relatively high volume industrial exhausts; said tower being principally exteriorly supported at its perimeter, having a plurality of interior horizontal perforated trays whereby the interface is maximized between a scrubbing liquid and the counterflowing exhaust ascending through said perforated trays, and having downcomers whereby said scrubbing liquid descends through the series of said trays while maintaining the pressure differential that drives said exhaust; said tower comprising:

a. a plurality of prefabricated constituent subunits, a plurality of which are exterior perimeter subunits, each of the latter comprising:
  (1) a section of perimeter wall comprising:
    i. a corrosion resistant plate;
    ii. a rib framework attached to said plate whereby said plate is exteriorly reinforced; and
    iii. a plurality of tray supports attached to the interior of said plate;
  (2) at least one interior vertical support;
  (3) additional substantially horizontal tray supports connecting said vertical support to said perimeter wall section;
  (4) a plurality of tray sections mounted on said tray supports;
b. a foundation upon which said tower is supported;
c. means to secure said constituent subunits to said foundation;
d. means to connect said constituent subunits to each other whereby a single functional scrubber tower is assembled from a plurality of said constituent subunits; said connection means comprising;
  (1) means to interconnect the rib framework of adjacent perimeter constituent subunits; and
  (2) sealing means to seal the connection of adjacent perimeter wall sections;
e. an inlet through at least one perimeter wall section whereby the exhaust bearing toxic gases and pollutants enters said scrubber tower;
f. a roof connected to an upper edge of said perimeter wall section of at least one of said perimeter subunits having a chimney whereby cleansed exhaust is released from the scrubber tower;
g. a floor connected to each said perimeter wall section of at least one of said perimeter subunits between said foundation and the lowermost of said trays; and
h. sealing means to seal the connection of the floor to said perimeter wall sections of said at least one perimeter subunit which is connected to the floor.

3. A scrubber tower in accordance with claim 2 in which at least one of said exterior perimeter subunits further comprises:
at least a second vertical support;
additional horizontal tray supports attached between said vertical supports within said at least one exterior perimeter subunit; and
means for connecting adjacent vertical supports of adjacent subunits together.

4. A scrubber tower in accordance with claim 2 in which at least one of said prefabricated constituent subunit is a wholly interior constituent subunit having no perimeter wall section, said wholly interior constituent subunit comprising:
a plurality of interior vertical supports;
horizontal tray supports attached between said vertical supports;
diagonal braces connected between internal structural members; and
a plurality of tray sections mounted on said tray supports.

5. A scrubber tower in accordance with claim 2 further comprising at least one common wall which is reinforced on each side by a rib framework formed of tray supports whereby said common wall is sharable between adjacent perimeter subunits.

6. A scrubber tower for removing toxic gases and pollutants from relative high volume industrial exhausts; said tower being principally exteriorly supported at its perimeter, having means for mixing a scrubbing liquid with the exhaust; said tower comprising:

a. a plurality of prefabricated constituent subunits, a plurality of which are perimeter subunits, each said perimeter subunit comprising:
  (1) a perimeter wall section comprising:
    i. a corrosion resistant plate;
    ii. a rib framework attached to said plate whereby said plate is exteriorly reinforced; and
    iii. a plurality of horizontal support members attached to the interior of said plate;
  (2) at least on interior vertical support; and
  (3) additional substantially horizontal supports connecting said vertical support to said perimeter wall section;
b. a foundation upon which said tower is supported;
c. means for securing said constituent subunits to said foundation;

d. means to connect said constituent subunits to each other whereby a single functional scrubber tower is assembled from a plurality of said constituent subunits; said connection means comprising;
   (1) means for interconnecting the rib framework of adjacent perimeter constituent subunits; and
   (2) means for sealing the connection of adjacent perimeter wall sections;
e. an inlet through at least one of said perimeter wall sections whereby the exhaust bearing toxic gases and pollutants enters said scrubber tower;
f. a roof connected to an upper edge of said perimeter wall section of at least one of said perimeter subunits having a chimney whereby cleansed exhaust is released from the scrubber tower; and
g. a floor connected to each said perimeter wall section of at least one of said perimeter subunits.

7. A scrubber tower in accordance with claim 6 in which at least one of said exterior perimeter subunit further comprises:
at least a second vertical support;
additional horizontal tray supports attached between said vertical supports within said at least one exterior perimeter subunit; and
means for connecting adjacent vertical supports of adjacent subunits together.

8. A scrubber tower in accordance with claim 6 in which at least one of said prefabricated constituent subunit is a wholly interior constituent subunit having no perimeter wall section, said wholly interior constituent subunit comprising:
a plurality of interior vertical supports;
horizontal tray supports attached between said vertical supports;
diagonal braces connected between internal structural members; and
a plurality of tray sections mounted on said tray supports.

9. A scrubber tower in accordance with claim 6 further comprising at least one common wall which is reinforced on each side by a rib framework formed of tray supports whereby said common wall is sharable between adjacent perimeter subunits.

* * * * *